(12) United States Patent
Wang et al.

(10) Patent No.: US 11,109,275 B2
(45) Date of Patent: Aug. 31, 2021

(54) VARIABLE BANDWIDTH-BASED COMMUNICATION METHOD AND APPARATUS

(71) Applicant: HUAWEI TECHNOLOGIES CO., LTD., Guangdong (CN)

(72) Inventors: Hong Wang, Beijing (CN); Wei Quan, Beijing (CN); Jian Zhang, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 20 days.

(21) Appl. No.: 16/394,453

(22) Filed: Apr. 25, 2019

(65) Prior Publication Data

US 2019/0253933 A1  Aug. 15, 2019

Related U.S. Application Data

(63) Continuation of application No. PCT/CN2016/103454, filed on Oct. 26, 2016.

(51) Int. Cl.
*H04W 28/20* (2009.01)
*H04W 8/24* (2009.01)
(Continued)

(52) U.S. Cl.
CPC ............. *H04W 28/20* (2013.01); *H04W 8/24* (2013.01); *H04W 24/10* (2013.01);
(Continued)

(58) Field of Classification Search
CPC combination set(s) only.
See application file for complete search history.

(56) References Cited

U.S. PATENT DOCUMENTS

| 9,549,328 B2* | 1/2017 | Herzen | H04W 24/02 |
| 10,790,951 B2* | 9/2020 | Gao | H04L 5/0048 |

(Continued)

FOREIGN PATENT DOCUMENTS

| CN | 102440051 A | 5/2012 |
| CN | 102448125 A | 5/2012 |

(Continued)

OTHER PUBLICATIONS

QUALCOMM Incorporated,"Dynamic Bandwidth Switching for Reducing Power Consumption in Wireless Communication Devices",U.S. Appl. No. 62/073,603, filed Oct. 31, 2014, total 55 pages.

(Continued)

*Primary Examiner* — Xavier S Wong
(74) *Attorney, Agent, or Firm* — Womble Bond Dickinson (US) LLP

(57) ABSTRACT

Embodiments of the present invention provide a variable bandwidth-based communication method and an apparatus. The method includes: sending, by a network node, indication information to UE, where the indication information is used to indicate a target bandwidth parameter used by a serving cell corresponding to the UE; and communicating, by the network node, with the UE based on the target bandwidth parameter, where the target bandwidth parameter includes at least one of a target bandwidth, a target center frequency, and an enablement time of the target bandwidth. In this way, the network node can communicate with the UE in a changed bandwidth, so as to avoid a case in which communication is still performed in a relatively high bandwidth when a network load is relatively low, and reduce device power consumption.

9 Claims, 4 Drawing Sheets

(51) Int. Cl.
*H04W 24/10* (2009.01)
*H04W 72/04* (2009.01)

(52) U.S. Cl.
CPC ... *H04W 72/0446* (2013.01); *H04W 72/0453* (2013.01); *Y02D 30/70* (2020.08)

(56) References Cited

U.S. PATENT DOCUMENTS

| | | | |
|---|---|---|---|
| 2003/0097460 A1* | 5/2003 | Higashiyama | H04L 47/822 709/232 |
| 2005/0260999 A1* | 11/2005 | Csapo | H04B 7/2634 455/452.2 |
| 2008/0232399 A1* | 9/2008 | Groleau | H04W 28/20 370/468 |
| 2011/0003609 A1 | 1/2011 | Sundstroem et al. | |
| 2011/0235684 A1 | 9/2011 | Dahlman et al. | |
| 2013/0176954 A1 | 7/2013 | Lv et al. | |
| 2013/0182655 A1 | 7/2013 | Das et al. | |
| 2013/0244666 A1 | 9/2013 | Carmon et al. | |
| 2013/0265385 A1* | 10/2013 | Wang | H04L 65/1069 348/14.09 |
| 2014/0133433 A1 | 5/2014 | Ahn et al. | |
| 2015/0282068 A1* | 10/2015 | Rajagopal | H04L 5/0048 370/350 |
| 2015/0289279 A1* | 10/2015 | Xu | H04W 72/0486 370/329 |
| 2016/0127991 A1 | 5/2016 | Ang et al. | |
| 2016/0294528 A1* | 10/2016 | Kim | H04L 5/0094 |
| 2016/0302206 A1 | 10/2016 | Xing et al. | |
| 2017/0142074 A1* | 5/2017 | Mihaly | H04L 47/2441 |
| 2017/0310384 A1 | 10/2017 | Park et al. | |

FOREIGN PATENT DOCUMENTS

| | | |
|---|---|---|
| CN | 102474280 A | 5/2012 |
| CN | 103999532 A | 8/2014 |
| CN | 105075370 A | 11/2015 |
| EP | 2413636 A1 | 2/2012 |
| EP | 2437402 A1 | 4/2012 |
| WO | 2014158235 A1 | 10/2014 |
| WO | 2016056824 A1 | 4/2016 |

OTHER PUBLICATIONS

3GPP TR 38.913 V14.0.0 (Oct. 2016);3rd Generation Partnership Project;Technical Specification Group Radio Access Network;Study on Scenarios and Requirements for Next Generation Access Technologies;(Release 14);total 39 pages.

* cited by examiner

VARIABLE BANDWIDTH-BASED COMMUNICATION METHOD AND APPARATUS

CROSS-REFERENCE TO RELATED APPLICATIONS

This application is a continuation of International Application No. PCT/CN2016/103454, filed on Oct. 26, 2016, the disclosure of which is hereby incorporated by reference in its entirety.

TECHNICAL FIELD

Embodiments of the present invention relate to the field of communications technologies, and in particular, to a variable bandwidth-based communication method and an apparatus.

BACKGROUND

A cell-specific reference signal (CRS) is valid to all user equipments (UE) in a cell. Functions of the CRS are as follows: (1) The CRS may be used by UE to perform channel estimation on a downlink physical channel. (2) The CRS may be used by UE to obtain channel state information (CSI). (3) A CRS-based UE measurement may be used to determine cell selection and handover. Because of the foregoing functions of the CRS, in Long Term Evolution (LTE), the CRS is sent on each RB (Resource Block) in an entire downlink bandwidth in each downlink subframe. In existing LTE, a system bandwidth supports 1.4 MHz, 3 MHz, 5 MHz, 10 MHz, 15 MHz, and 20 MHz that are respectively corresponding to 6 RBs, 15 RBs, 25 RBs, 50 RBs, 75 RBs, and 100 RBs. In a network planning process, after a system bandwidth is determined, a base station continuously sends a CRS to UE based on the system bandwidth, and the UE continuously receives the CRS as required, based on the system bandwidth. However, when a network load is relatively low, transmitting a CRS in a relatively high system bandwidth increases device power consumption.

SUMMARY

Embodiments of the present invention provide a variable bandwidth-based communication method and an apparatus, so as to reduce device power consumption.

According to a first aspect, an embodiment of the present invention provides a variable bandwidth-based communication method, including: sending, by a network node, indication information to UE, where the indication information is used to indicate a target bandwidth parameter used by a serving cell corresponding to the UE; and communicating, by the network node, with the UE based on the target bandwidth parameter, where the target bandwidth parameter includes at least one of a target bandwidth, a target center frequency, and an enablement time of the target bandwidth.

In one embodiment, the indication information further includes the target bandwidth parameter.

In one embodiment, before the network node sends the indication information to the UE, the network node sends a bandwidth parameter list to the UE, where the bandwidth parameter list includes at least one group of bandwidth parameters and corresponding parameter indexes, the bandwidth parameter includes at least one of a bandwidth, a center frequency, and an enablement time of the bandwidth, and the indication information includes a parameter index corresponding to the target bandwidth parameter.

In one embodiment, the network node further sends first capability indication information to the UE, where the first capability indication information is used to indicate that the network node has a variable bandwidth-based communication capability.

In one embodiment, the network node further receives second capability indication information sent by the UE, where the second capability indication information is used to indicate that the UE has a variable bandwidth-based communication capability.

In one embodiment, the bandwidth is a system bandwidth or a scheduling bandwidth.

According to a second aspect, an embodiment of the present invention provides a variable bandwidth-based communication method, including: receiving, by UE, indication information sent by a network node, where the indication information is used to indicate a target bandwidth parameter used by a serving cell corresponding to the UE; obtaining, by the UE, the target bandwidth parameter based on the indication information; and communicating, by the UE, with the network node based on the target bandwidth parameter, where the target bandwidth parameter includes at least one of a target bandwidth, a target center frequency, and an enablement time of the target bandwidth.

In one embodiment, the indication information further includes the target bandwidth parameter.

In one embodiment, before receiving the indication information sent by the network node, the UE further receives a bandwidth parameter list sent by the network node, where the bandwidth parameter list includes at least one group of bandwidth parameters and corresponding parameter indexes, the bandwidth parameter includes at least one of a bandwidth, a center frequency, and an enablement time of the bandwidth, and the indication information includes a parameter index corresponding to the target bandwidth parameter; and the obtaining, by the UE, the target bandwidth parameter based on the indication information includes: obtaining, by the UE, the target bandwidth parameter based on the parameter index corresponding to the target bandwidth parameter, and the bandwidth parameter list.

In one embodiment, before the UE communicates with the network node based on the target bandwidth parameter, when the target center frequency is different from a center frequency currently used by the UE, the UE further switches the currently used center frequency to the target center frequency within a preset symbol before the enablement time of the target bandwidth or within a preset symbol after the enablement time of the target bandwidth.

In one embodiment, the UE further receives first capability indication information sent by the network node, where the first capability indication information is used to indicate that the network node has a variable bandwidth-based communication capability.

In one embodiment, the UE further sends second capability indication information to the network node, where the second capability indication information is used to indicate that the UE has a variable bandwidth-based communication capability.

In one embodiment, the bandwidth is a system bandwidth or a scheduling bandwidth.

According to a third aspect, an embodiment of the present invention provides a variable bandwidth-based communication method, including: sending, by a first network node, a configuration update message to a second network node, where the configuration update message includes indication information and an identifier of a cell, and the indication information is used to indicate a target system bandwidth parameter of the cell; and communicating, by the first network node, with UE based on the target system bandwidth parameter, where the cell is a serving cell corresponding to the UE, and the target system bandwidth parameter includes at least one of a target system bandwidth, a target center frequency, and an enablement time of the target system bandwidth.

According to a fourth aspect, an embodiment of the present invention provides a variable bandwidth-based communication method, including: receiving, by a second network node, a configuration update message sent by a first network node, where the configuration update message includes indication information and an identifier of a cell, and the indication information is used to indicate a target system bandwidth parameter of the cell; and configuring, by the second network node, a measurement parameter of UE based on the target system bandwidth parameter, where a serving cell corresponding to the UE is a cell managed by the second network node, and the target system bandwidth parameter includes at least one of a target system bandwidth, a target center frequency, and an enablement time of the target system bandwidth.

According to a fifth aspect, an embodiment of the present invention provides a network node, including: a sending unit, configured to send indication information to UE, where the indication information is used to indicate a target bandwidth parameter used by a serving cell corresponding to the UE; and a processing unit, configured to communicate with the UE based on the target bandwidth parameter, where the target bandwidth parameter includes at least one of a target bandwidth, a target center frequency, and an enablement time of the target bandwidth.

In one embodiment, the indication information further includes the target bandwidth parameter.

In one embodiment, the sending unit is further configured to send a bandwidth parameter list to the UE before sending the indication information to the UE, where the bandwidth parameter list includes at least one group of bandwidth parameters and corresponding parameter indexes, the bandwidth parameter includes at least one of a bandwidth, a center frequency, and an enablement time of the bandwidth, and the indication information includes a parameter index corresponding to the target bandwidth parameter.

In one embodiment, the sending unit is further configured to send first capability indication information to the UE, where the first capability indication information is used to indicate that the network node has a variable bandwidth-based communication capability.

In one embodiment, the network node further includes a receiving unit, configured to receive second capability indication information sent by the UE, where the second capability indication information is used to indicate that the UE has a variable bandwidth-based communication capability.

In one embodiment, the bandwidth is a system bandwidth or a scheduling bandwidth.

According to a sixth aspect, an embodiment of the present invention provides UE, including: a receiving unit, configured to receive indication information sent by a network node, where the indication information is used to indicate a target bandwidth parameter used by a serving cell corresponding to the UE; and a processing unit, configured to: obtain the target bandwidth parameter based on the indication information, and communicate with the network node based on the target bandwidth parameter, where the target bandwidth parameter includes at least one of a target bandwidth, a target center frequency, and an enablement time of the target bandwidth.

In one embodiment, the indication information further includes the target bandwidth parameter.

In one embodiment, the receiving unit is further configured to: before receiving the indication information sent by the network node, receive a bandwidth parameter list sent by the network node, where the bandwidth parameter list includes at least one group of bandwidth parameters and corresponding parameter indexes, the bandwidth parameter includes at least one of a bandwidth, a center frequency, and an enablement time of the bandwidth, and the indication information includes a parameter index corresponding to the target bandwidth parameter; and when obtaining the target bandwidth parameter based on the indication information, the processing unit is specifically configured to obtain the target bandwidth parameter based on the parameter index corresponding to the target bandwidth parameter, and the bandwidth parameter list.

In one embodiment, before communicating with the network node based on the target bandwidth parameter, the processing unit is further configured to: when the target center frequency is different from a center frequency currently used by the UE, switch the used center frequency to the target center frequency within a preset symbol before the enablement time of the target bandwidth or within a preset symbol after the enablement time of the target bandwidth.

In one embodiment, the receiving unit is further configured to receive first capability indication information sent by the network node, where the first capability indication information is used to indicate that the network node has a variable bandwidth-based communication capability.

In one embodiment, the UE further includes a sending unit, configured to send second capability indication information to the network node, where the second capability indication information is used to indicate that the UE has a variable bandwidth-based communication capability.

In one embodiment, the bandwidth is a system bandwidth or a scheduling bandwidth.

According to a seventh aspect, an embodiment of the present invention provides a network node, including: a sending unit, configured to send a configuration update message to a second network node, where the configuration update message includes indication information and an identifier of a cell, and the indication information is used to indicate a target system bandwidth parameter of the cell; and a processing unit, configured to communicate with UE based on the target system bandwidth parameter, where the cell is a serving cell corresponding to the UE, and the target system bandwidth parameter includes at least one of a target system bandwidth, a target center frequency, and an enablement time of the target system bandwidth.

According to an eighth aspect, an embodiment of the present invention provides a network node, including: a receiving unit, configured to receive a configuration update message sent by a first network node, where the configuration update message includes indication information and an identifier of a cell, and the indication information is used to indicate a target system bandwidth parameter of the cell; and a processing unit, configured to configure a measurement parameter of UE based on the target system bandwidth parameter, where a serving cell corresponding to the UE is a cell managed by the second network node, and the target system bandwidth parameter includes at least one of a target system bandwidth, a target center frequency, and an enablement time of the target system bandwidth.

According to the variable bandwidth-based communication method and the apparatus provided in the embodiments of the present invention, in the foregoing solutions, the network node can communicate with the UE in a changed bandwidth, so as to avoid a case in which communication is still performed in a relatively high bandwidth when a network load is relatively low, and reduce device power consumption.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
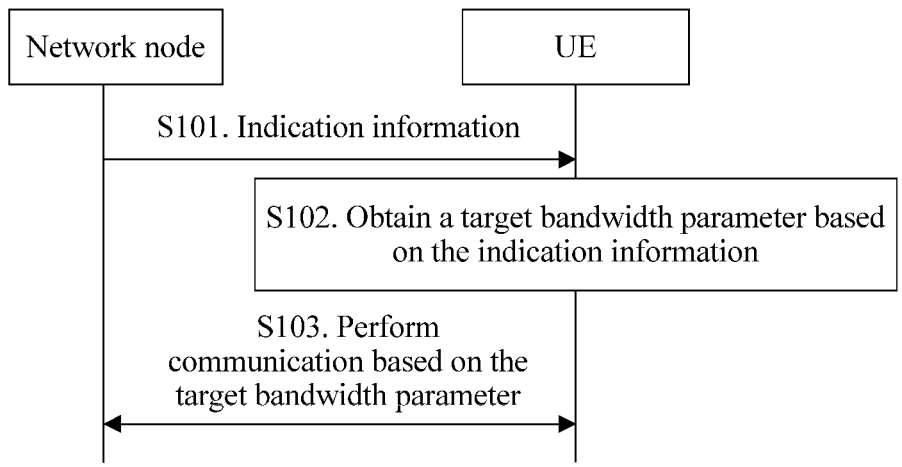
FIG. 1 is a flowchart of a variable bandwidth-based communication method according to a first embodiment of the present invention.

FIG. 1 is a flowchart of a variable bandwidth-based communication method according to a first embodiment of the present invention. As shown in FIG. 1, the method in this embodiment may include the following operations.

Operation S101. A network node sends indication information to UE.

The indication information is used to indicate a target bandwidth parameter used by a serving cell corresponding to the UE.

In this embodiment, after the network node determines that a bandwidth of a cell needs to be changed, the network node sends indication information to (at least one) UE in a coverage area of the cell. Herein, one UE is used as an example for description. The indication information is used to indicate a target bandwidth parameter used by a serving cell corresponding to the UE, and the target bandwidth parameter is a bandwidth parameter used after the bandwidth is changed. The target bandwidth parameter includes at least one of a target bandwidth, a target center frequency, and an enablement time of the target bandwidth. In one embodiment, the indication information is further used to indicate that a bandwidth used by the serving cell corresponding to the UE is changed. In one embodiment, the serving cell corresponding to the UE may be a cell corresponding to the network node, for example, a cell managed by the network node. In one embodiment, the network node may be an evolved NodeB (eNB) or a central unit (CU). The cell may be a cell managed by the eNB, or may be a cell including a distributed unit (DU) controlled by the central unit, for example, a hyper-cell. The network node may alternatively be the distributed unit DU. The network node may send the indication information to the UE by using a paging message or dedicated signaling.

Operation S102. The UE obtains a target bandwidth parameter based on the indication information.

In this embodiment, after receiving the indication information sent by the network node, the UE obtains the target bandwidth parameter based on the indication information.

Operation S103. The network node communicates with the UE based on the target bandwidth parameter.

In this embodiment, the network node can communicate with the UE based on the target bandwidth parameter, and the UE may also communicate with the network node based on the target bandwidth parameter. In other words, the network node and the UE start to communicate in the target bandwidth and the target center frequency at the enablement time of the target bandwidth.

In one embodiment, the bandwidth may be a system bandwidth, to be specific, a system bandwidth of a cell is changed. For example, the system bandwidth is 25 RBs before a moment T1, and the system bandwidth is 10 RBs after the moment T1. In this case, correspondingly, the target bandwidth parameter is a target system bandwidth parameter. To avoid affecting UE that camps on the cell, the target system bandwidth parameter includes at least one of a target system bandwidth, a target center frequency, and an enablement time of the target system bandwidth. For example, S103 may be as follows: The network node sends a reference signal (for example, a CRS) used for measurement to the UE based on the target system bandwidth parameter, and correspondingly, the UE receives, based on the target system bandwidth parameter, the reference signal (for example, the CRS) used for measurement that is sent by the network node. In this case, when the system bandwidth is changed, the network node may send, by using broadcast signaling, some candidate system bandwidth parameters to UE in a coverage area of the network node before the system bandwidth is changed, and then send a specific selected system bandwidth parameter to the UE in the coverage area of the network node by using a paging message. In addition, the network node may send, by using dedicated signaling, the indication information to UE in a connected mode that is served by the network node.

In addition, in an existing LTE system, when scheduling UE by using a physical downlink control channel (PDCCH), a base station sends the PDCCH in an entire system bandwidth. Therefore, the UE needs to receive the PDCCH in the entire system bandwidth. Even if an amount of downlink control information that is carried on the PDCCH is relatively small, the UE needs to decode a relatively large quantity of PDCCH resources, and consequently power consumption of the UE is increased. In addition, from a perspective of a network side, efficiency of sending PDCCH resources is reduced. In one embodiment, the bandwidth may be a scheduling bandwidth, to be specific, a bandwidth for scheduling the UE is changed. For example, the UE is scheduled on 25 RBs before a moment T2, and the UE is scheduled on 10 RBs after the moment T2. In this case, correspondingly, the target bandwidth parameter is a target scheduling bandwidth parameter, and the target scheduling bandwidth parameter includes at least one of a target scheduling bandwidth, a target center frequency, and an enablement time of the target scheduling bandwidth. The scheduling bandwidth may be a part of the system bandwidth. For example, S103 may be as follows: The network node sends a PDCCH and/or a PDSCH to the UE based on the target scheduling bandwidth parameter, and correspondingly, the UE receives, based on the target scheduling bandwidth parameter, the PDCCH and/or the PDSCH that are/is sent by the network node. In this case, when a scheduling bandwidth of UE is changed, the network node may send, by using dedicated signaling or a paging message, the indication information to the UE before the scheduling bandwidth is changed.

In the variable bandwidth-based communication method provided in this embodiment, the network node sends the indication information to the UE, and the UE receives the indication information sent by the network node; and then the network node communicates with the UE based on the target bandwidth parameter indicated by the indication information, so that the network node can communicate with the UE in a changed bandwidth, thereby avoiding a case in which communication is still performed in a relatively high bandwidth when a network load is relatively low, and reducing device power consumption.

Figure 2:
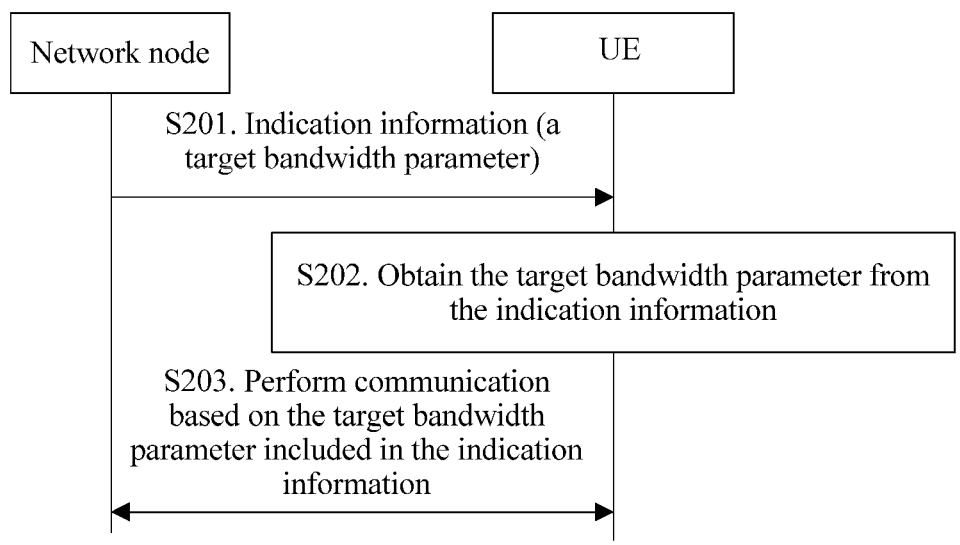
FIG. 2 is a flowchart of a variable bandwidth-based communication method according to a second embodiment of the present invention.

FIG. 2 is a flowchart of a variable bandwidth-based communication method according to a second embodiment of the present invention. As shown in FIG. 2, the method in this embodiment may include the following operations:

Operation S201. A network node sends indication information to UE, where the indication information includes a target bandwidth parameter.

Operation S202. The UE obtains the target bandwidth parameter from the indication information.

Operation S203. The network node communicates with the UE based on the target bandwidth parameter included in the indication information.

In this embodiment, the network node sends the indication information to the UE, and the indication information includes a target bandwidth that is determined by the network node and that is obtained after a bandwidth of a serving cell corresponding to the UE is changed. The target bandwidth parameter includes at least one of a target bandwidth, a target center frequency, and an enablement time of the target bandwidth. Then, after receiving the indication information, the UE obtains the included target bandwidth parameter from the indication information. The network node communicates with the UE based on the target bandwidth parameter included in the sent indication information, and the UE communicates with the network node based on the target bandwidth parameter included in the received indication information.

In one embodiment, the bandwidth may be a system bandwidth. In one embodiment, the bandwidth may be a scheduling bandwidth. For specific descriptions, refer to related descriptions in the embodiment shown in FIG. 1.

In one embodiment, the indication information is included in a paging message. In this embodiment, the network node sends the indication information (including the target bandwidth parameter) to the UE by using the paging message, so as to avoid sending the target bandwidth parameter to the UE by using a system message, thereby reducing system message overheads and reducing device power consumption.

In the variable bandwidth-based communication method provided in this embodiment, the network node sends the indication information that includes the target bandwidth parameter to the UE, and then the network node communicates with the UE based on the target bandwidth parameter included in the indication information, so that the network node notifies the UE of the target bandwidth, and then can communicate with the UE in the target bandwidth, thereby avoiding a case in which communication is still performed in a relatively high bandwidth when a network load is relatively low, and reducing device power consumption.

Figure 3:
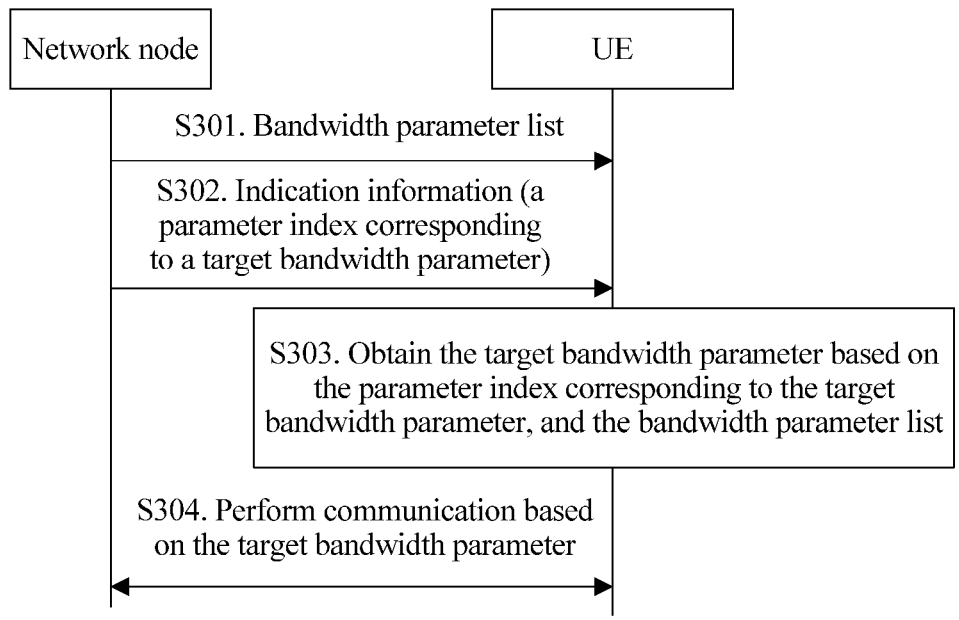
FIG. 3 is a flowchart of a variable bandwidth-based communication method according to a third embodiment of the present invention.

FIG. 3 is a flowchart of a variable bandwidth-based communication method according to a third embodiment of the present invention. As shown in FIG. 3, the method in this embodiment may include the following operations.

Operation S301. A network node sends a bandwidth parameter list to UE.

The bandwidth parameter list includes at least one group of bandwidth parameters and corresponding parameter indexes, and the bandwidth parameter includes at least one of a bandwidth, a center frequency, and an enablement time of the bandwidth. In one embodiment, the bandwidth parameter list may include a system bandwidth parameter list or a scheduling bandwidth parameter list, and the system bandwidth parameter list may be shown in Table 1.

TABLE 1

| Parameter index | System bandwidth | Center frequency | Enablement time |
|---|---|---|---|
| 1 | 1.4 MHz/6 RBS | F1 | SFN + Subframe |
| 2 | | F2 | SFN + Subframe |
| 3 | | F3 | SFN + Subframe |
| 4 | 3 MHz/15 RBS | F1 | SFN + Subframe |
| 5 | | F2 | SFN + Subframe |
| 6 | | F3 | SFN + Subframe |
| 7 | 5 MHz/25 RBS | F1 | SFN + Subframe |
| 8 | | F2 | SFN + Subframe |
| 9 | | F3 | SFN + Subframe |
| 10 | 10 MHz/50 RBS | F4 | SFN + Subframe |
| 11 | 15 MHz/75 RBS | F5 | SFN + Subframe |
| 12 | 20 MHz/100 RBS | F6 | SFN + Subframe |

In one embodiment, the enablement time may be represented by using a system frame number (SFN), may be represented by using a subframe number, or may be represented by using a combination thereof.

Figure 4:
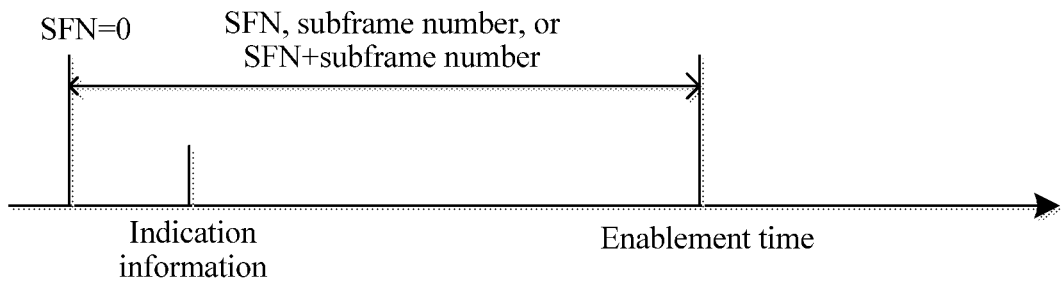
FIG. 4 is a schematic diagram of an enablement time according to an embodiment of the present invention.

In one embodiment, a system frame numbered "0" may be used as a reference point for the enablement time. As shown in FIG. 4, the enablement time is a time distance from the system frame numbered "0" that is used as the reference point, by a time corresponding to a system frame number, or by a time corresponding to a subframe number, or by a time corresponding to a system frame number plus a subframe number that is indicated by indication information.

Figure 5:
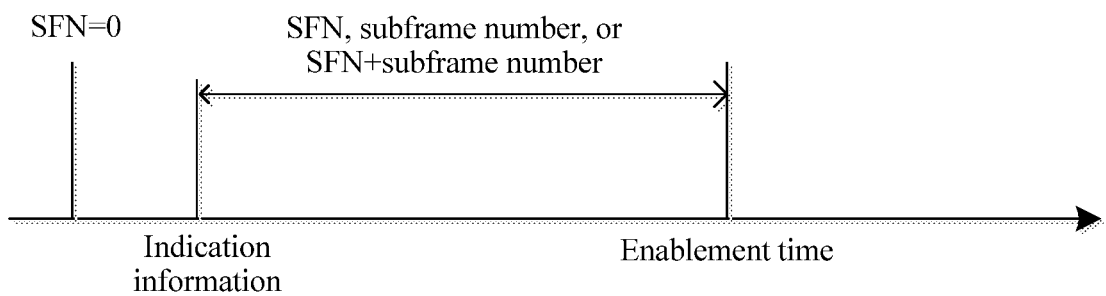
FIG. 5 is a schematic diagram of an enablement time according to an embodiment of the present invention.

In one embodiment, a moment at which the UE receives the indication information may be used as a reference point for the enablement time. As shown in FIG. 5, the enablement time is a time distance from the moment for receiving the indication information that is used as the reference point, by a time corresponding to a system frame number, or by a time corresponding to a subframe number, or by a time corresponding to a system frame number plus a subframe number that is indicated by the indication information.

In addition, parameter indexes in the parameter list may be explicitly indicated, or may be implicitly indicated. Explicit indication is shown in Table 1, to be specific, indexes corresponding to each group of parameters are explicitly indicated in the parameter list. Implicit indication means that Table 1 does not include a column "parameter index", but each group of parameters implies a correspondence between indexes from top to bottom. It should be noted that parameter indexes included in the indication information are explicitly indicated.

It should be noted that in this embodiment, when the bandwidth parameter does not include the center frequency, it indicates that the center frequency remains unchanged; or when the bandwidth parameter does not include the bandwidth, it indicates that the bandwidth remains unchanged, and only the center frequency is changed.

In this embodiment, the network node may send the bandwidth parameter list to the UE in advance, and the UE receives the bandwidth parameter list sent by the network node.

Operation S302. The network node sends indication information to the UE, where the indication information includes a parameter index corresponding to a target bandwidth parameter.

In this embodiment, after determining that a bandwidth used by a serving cell corresponding to the UE needs to be changed, the network node sends the indication information to the UE. The indication information includes a parameter index corresponding to a target bandwidth parameter used by the serving cell corresponding to the UE.

Operation S303. The UE obtains the target bandwidth parameter based on the parameter index corresponding to the target bandwidth parameter, and the bandwidth parameter list.

Operation S304. The network node communicates with the UE based on the target bandwidth parameter.

In this embodiment, after receiving the indication information sent by the network node, the UE searches the bandwidth parameter list based on the parameter index, in the indication information, that is corresponding to the target bandwidth parameter, and obtains, from the bandwidth parameter list, a bandwidth parameter corresponding to the parameter index. The bandwidth parameter corresponding to the parameter index is the target bandwidth parameter. Then, the network node communicates with the UE based on the target bandwidth parameter.

In one embodiment, when the bandwidth parameter list is included in a system message or dedicated signaling, in this embodiment, the network node sends the bandwidth parameter list to the UE by using the system message or the dedicated signaling; or when the indication information is included in a paging message or dedicated signaling, in this embodiment, the network node sends the indication information (including the parameter index) to the UE by using the paging message or the dedicated signaling, so as to avoid sending the target bandwidth parameter to the UE by using a system message each time a bandwidth is changed, thereby reducing system message overheads and reducing device power consumption.

In the variable bandwidth-based communication method provided in this embodiment, the network node sends the bandwidth parameter list to the UE, and then sends the indication information to the UE, and the indication information includes the parameter index corresponding to the target bandwidth parameter. The UE obtains the target bandwidth parameter based on the parameter index corresponding to the target bandwidth parameter, and the bandwidth parameter list. Then, the network node communicates with the UE based on the target bandwidth parameter. Therefore, the network node notifies the UE of a target bandwidth, and then can communicate with the UE in the target bandwidth, so as to avoid a case in which communication is still performed in a relatively high bandwidth when a network load is relatively low, and reduce device power consumption.

In one embodiment, on the basis of the foregoing embodiments, when the target center frequency is different from a center frequency currently used by the UE, the UE switches the currently used center frequency to the target center frequency within a preset symbol before the enablement time of the target bandwidth or within a preset symbol after the enablement time of the target bandwidth. In one embodiment, the preset symbol is two symbols.

In one embodiment, the UE may switch the used center frequency to the target center frequency within the preset symbol before the enablement time of the target bandwidth or within the preset symbol after the enablement time of the target bandwidth.

In one embodiment, the indication information is further used to instruct the UE to switch the used center frequency to the target center frequency within the preset symbol before the enablement time of the target bandwidth, or the indication information is further used to instruct the UE to switch the used center frequency to the target center frequency within the preset symbol after the enablement time of the target bandwidth. The UE switches the currently used center frequency to the target center frequency within the preset symbol before the enablement time of the target bandwidth or within the preset symbol after the enablement time of the target bandwidth based on the indication information.

In one embodiment, on the basis of the foregoing embodiments, the method may further include: sending, by the network node, first capability indication information to the UE, where the first capability indication information is used to indicate that the network node has a variable bandwidth-based communication capability; and correspondingly, receiving, by the UE, the first capability indication information sent by the network node. Then, the network node and the UE perform the foregoing embodiments.

In one embodiment, on the basis of the foregoing embodiments, the method may further include: sending, by the UE, second capability indication information to the network node, where the second capability indication information is used to indicate that the UE has a variable bandwidth-based communication capability; and correspondingly, receiving, by the network node, the second capability indication information sent by the UE. Then, the network node and the UE perform the foregoing embodiments.

In the present application, the variable bandwidth-based communication capability means that the UE or the network node has a capability of dynamically changing a system bandwidth or a scheduling bandwidth.

Figure 6:
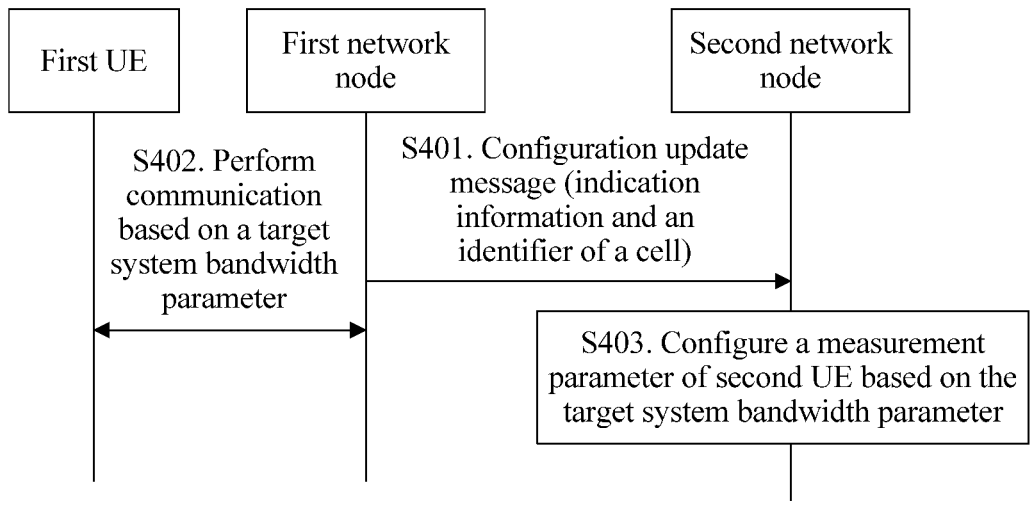
FIG. 6 is a flowchart of a variable bandwidth-based communication method according to a fourth embodiment of the present invention.

FIG. 6 is a flowchart of a variable bandwidth-based communication method according to a fourth embodiment of the present invention. As shown in FIG. 6, the method in this embodiment may include the following operations.

Operation S401. A first network node sends a configuration update message to a second network node.

The configuration update message includes indication information and an identifier of a cell, and the indication information is used to indicate a target system bandwidth parameter of the cell.

In this embodiment, after the first network node determines that a system bandwidth of a cell needs to be changed, the first network node sends the configuration update message to the second network node. The cell is a cell corresponding to the first network node. For example, the cell is a cell managed by the first network node. The configuration update message includes the indication information and the identifier of the cell. In one embodiment, an adjacent cell of the cell is a cell corresponding to the second network node (for example, a cell managed by the second network node).

For related descriptions of the indication information, refer to related descriptions in any one of the first to the third embodiments of the present invention. Details are not described herein again.

The target system bandwidth parameter includes at least one of a target system bandwidth, a target center frequency, and an enablement time of the target system bandwidth.

Operation S402. The first network node communicates with first UE based on a target system bandwidth parameter.

In this embodiment, the cell is a serving cell of the first UE. Then, the first network node communicates with the first UE based on the target system bandwidth. For an implementation solution in which the first network node communicates with the first UE based on the target system bandwidth, refer to related descriptions in any one of the first to the third embodiments of the present invention. Details are not described herein again.

Operation S403. The second network node configures a measurement parameter of second UE based on the target system bandwidth parameter.

In this embodiment, after receiving the configuration update message, the second network node configures the measurement parameter of the second UE based on the target system bandwidth. A serving cell of the second UE is a cell corresponding to the second network node, for example, a cell managed by the second network node. In one embodiment, the serving cell of the second UE is an adjacent cell of the cell whose system bandwidth is changed.

It should be noted that there is no sequence for performing S402 and S403.

In the variable system bandwidth-based communication method provided in this embodiment, the first network node can communicate with the first UE in the target system bandwidth, so as to avoid a case in which communication is still performed in a relatively high system bandwidth when a network load is relatively low, and reduce device power consumption. In addition, after the system bandwidth of the cell is changed, the first network node may notify the second network node of the target system bandwidth of the cell, so that the second network node configures the measurement parameter of the second UE based on the target system bandwidth parameter.

Figure 7:
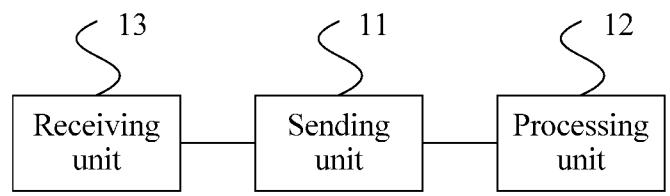
FIG. 7 is a schematic structural diagram of a network node according to a first embodiment of the present invention.

FIG. 7 is a schematic structural diagram of a network node according to a first embodiment of the present invention. As shown in FIG. 7, the network node in this embodiment includes a sending unit 11 and a processing unit 12.

The sending unit 11 is configured to send indication information to UE, and the indication information is used to indicate a target bandwidth parameter used by a serving cell corresponding to the UE.

The processing unit 12 is configured to communicate with the UE based on the target bandwidth parameter.

The target bandwidth parameter includes at least one of a target bandwidth, a target center frequency, and an enablement time of the target bandwidth.

In one embodiment, the indication information further includes the target bandwidth parameter.

In one embodiment, the sending unit 11 is further configured to send a bandwidth parameter list to the UE before sending the indication information to the UE. The bandwidth parameter list includes at least one group of bandwidth parameters and corresponding parameter indexes, and the bandwidth parameter includes at least one of a bandwidth, a center frequency, and an enablement time of the bandwidth.

The indication information includes a parameter index corresponding to the target bandwidth parameter.

In one embodiment, the sending unit 11 is further configured to send first capability indication information to the UE, and the first capability indication information is used to indicate that the network node has a variable bandwidth-based communication capability.

In one embodiment, the network node may further include a receiving unit 13.

The receiving unit 13 is configured to receive second capability indication information sent by the UE, and the second capability indication information is used to indicate that the UE has a variable bandwidth-based communication capability.

In one embodiment, the bandwidth is a system bandwidth or a scheduling bandwidth.

The network node in this embodiment may be configured to perform the technical solutions performed by the network node in the method embodiments shown in FIG. 1 to FIG. 3. Implementation principles and technical effects thereof are similar. Details are not described herein again.

Figure 8:
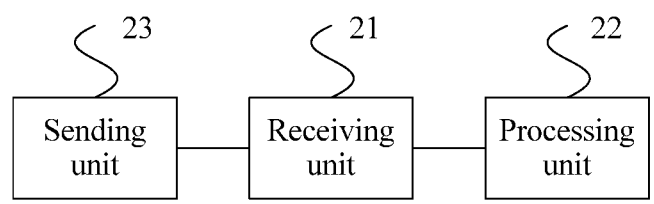
FIG. 8 is a schematic structural diagram of UE according to a first embodiment of the present invention.

FIG. 8 is a schematic structural diagram of UE according to a first embodiment of the present invention. As shown in FIG. 8, the UE in this embodiment includes a receiving unit 21 and a processing unit 22.

The receiving unit 21 is configured to receive indication information sent by a network node, and the indication information is used to indicate a target bandwidth parameter used by a serving cell corresponding to the UE.

The processing unit 22 is configured to: obtain the target bandwidth parameter based on the indication information, and communicate with the network node based on the target bandwidth parameter.

The target bandwidth parameter includes at least one of a target bandwidth, a target center frequency, and an enablement time of the target bandwidth.

In one embodiment, the indication information further includes the target bandwidth parameter.

In one embodiment, the receiving unit 21 is further configured to: before receiving the indication information sent by the network node, receive a bandwidth parameter list sent by the network node. The bandwidth parameter list includes at least one group of bandwidth parameters and corresponding parameter indexes, and the bandwidth parameter includes at least one of a bandwidth, a center frequency, and an enablement time of the bandwidth.

The indication information includes a parameter index corresponding to the target bandwidth parameter.

When obtaining the target bandwidth parameter based on the indication information, the processing unit 22 is specifically configured to obtain the target bandwidth parameter based on the parameter index corresponding to the target bandwidth parameter, and the bandwidth parameter list.

In one embodiment, before communicating with the network node based on the target bandwidth parameter, the processing unit 22 is further configured to: when the target center frequency is different from a center frequency currently used by the UE, switch the used center frequency to the target center frequency within a preset symbol before the enablement time of the target bandwidth or within a preset symbol after the enablement time of the target bandwidth.

In one embodiment, the receiving unit 21 is further configured to receive first capability indication information sent by the network node, and the first capability indication information is used to indicate that the network node has a variable bandwidth-based communication capability.

In one embodiment, the UE in this embodiment further includes a sending unit 23.

The sending unit 23 is configured to send second capability indication information to the network node, and the second capability indication information is used to indicate that the UE has a variable bandwidth-based communication capability.

In one embodiment, the bandwidth is a system bandwidth or a scheduling bandwidth.

The UE in this embodiment may be configured to perform the technical solutions performed by the UE in the method embodiments shown in FIG. 1 to FIG. 3. Implementation principles and technical effects thereof are similar. Details are not described herein again.

Figure 9:
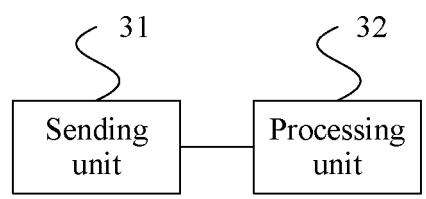
FIG. 9 is a schematic structural diagram of a network node according to a second embodiment of the present invention.

FIG. 9 is a schematic structural diagram of a network node according to a second embodiment of the present invention. As shown in FIG. 9, the network node in this embodiment includes a sending unit 31 and a processing unit 32.

The sending unit 31 is configured to send a configuration update message to a second network node. The configuration update message includes indication information and an identifier of a cell, and the indication information is used to indicate a target system bandwidth parameter of the cell.

The processing unit 32 is configured to communicate with UE based on the target system bandwidth parameter, and the cell is a serving cell corresponding to the UE.

The target system bandwidth parameter includes at least one of a target system bandwidth, a target center frequency, and an enablement time of the target system bandwidth.

The network node in this embodiment may be configured to perform the technical solutions performed by the first network node in the method embodiment shown in FIG. 6. Implementation principles and technical effects thereof are similar. Details are not described herein again.

Figure 10:
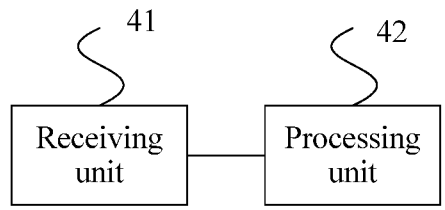
FIG. 10 is a schematic structural diagram of a network node according to a third embodiment of the present invention.

FIG. 10 is a schematic structural diagram of a network node according to a third embodiment of the present invention. As shown in FIG. 10, the network node in this embodiment includes a receiving unit 41 and a processing unit 42.

The receiving unit 41 is configured to receive a configuration update message sent by a first network node. The configuration update message includes indication information and an identifier of a cell, and the indication information is used to indicate a target system bandwidth parameter of the cell.

The processing unit 42 is configured to configure a measurement parameter of UE based on the target system bandwidth parameter, and a serving cell corresponding to the UE is a cell managed by the second network node.

The target system bandwidth parameter includes at least one of a target system bandwidth, a target center frequency, and an enablement time of the target system bandwidth.

The network node in this embodiment may be configured to perform the technical solutions performed by the second network node in the method embodiment shown in FIG. 6. Implementation principles and technical effects thereof are similar. Details are not described herein again.

Figure 11:
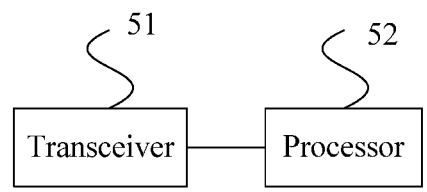
FIG. 11 is a schematic structural diagram of a network node according to a fourth embodiment of the present invention.

FIG. 11 is a schematic structural diagram of a network node according to a fourth embodiment of the present invention. As shown in FIG. 11, the network node in this embodiment includes a transceiver 51 and a processor 52. The network node in this embodiment may further include a memory (which is not shown), and the memory is configured to store program code for performing a variable bandwidth-based communication method.

The transceiver 51 is configured to send indication information to UE, and the indication information is used to indicate a target bandwidth parameter used by a serving cell corresponding to the UE.

The processor 52 is configured to communicate with the UE based on the target bandwidth parameter.

The target bandwidth parameter includes at least one of a target bandwidth, a target center frequency, and an enablement time of the target bandwidth.

In one embodiment, the indication information further includes the target bandwidth parameter.

In one embodiment, the transceiver 51 is further configured to send a bandwidth parameter list to the UE before sending the indication information to the UE. The bandwidth parameter list includes at least one group of bandwidth parameters and corresponding parameter indexes, and the bandwidth parameter includes at least one of a bandwidth, a center frequency, and an enablement time of the bandwidth.

The indication information includes a parameter index corresponding to the target bandwidth parameter.

In one embodiment, the transceiver 51 is further configured to send first capability indication information to the UE, and the first capability indication information is used to indicate that the network node has a variable bandwidth-based communication capability.

In one embodiment, the transceiver 51 is further configured to receive second capability indication information sent by the UE, and the second capability indication information is used to indicate that the UE has a variable bandwidth-based communication capability.

In one embodiment, the bandwidth is a system bandwidth or a scheduling bandwidth.

The network node in this embodiment may be configured to perform the technical solutions performed by the network node in the method embodiments shown in FIG. 1 to FIG. 3. Implementation principles and technical effects thereof are similar. Details are not described herein again.

Figure 12:
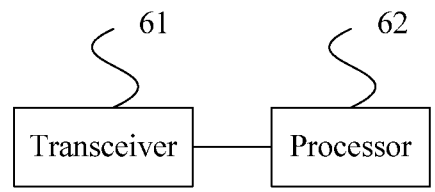
FIG. 12 is a schematic structural diagram of UE according to a second embodiment of the present invention.

FIG. 12 is a schematic structural diagram of UE according to a second embodiment of the present invention. As shown in FIG. 12, the UE in this embodiment includes a transceiver 61 and a processor 62. The UE in this embodiment may further include a memory (which is not shown), and the memory is configured to store program code for performing a variable bandwidth-based communication method.

The transceiver 61 is configured to receive indication information sent by a network node, and the indication information is used to indicate a target bandwidth parameter used by a serving cell corresponding to the UE.

The processor 62 is configured to: obtain the target bandwidth parameter based on the indication information, and communicate with the network node based on the target bandwidth parameter.

The target bandwidth parameter includes at least one of a target bandwidth, a target center frequency, and an enablement time of the target bandwidth.

In one embodiment, the indication information further includes the target bandwidth parameter.

In one embodiment, the transceiver 61 is further configured to: before receiving the indication information sent by the network node, receive a bandwidth parameter list sent by the network node. The bandwidth parameter list includes at least one group of bandwidth parameters and corresponding parameter indexes, and the bandwidth parameter includes at least one of a bandwidth, a center frequency, and an enablement time of the bandwidth.

The indication information includes a parameter index corresponding to the target bandwidth parameter.

When obtaining the target bandwidth parameter based on the indication information, the processor 62 is specifically configured to obtain the target bandwidth parameter based on the parameter index corresponding to the target bandwidth parameter, and the bandwidth parameter list.

In one embodiment, before communicating with the network node based on the target bandwidth parameter, the processor 62 is further configured to: when the target center frequency is different from a center frequency currently used by the UE, switch the used center frequency to the target center frequency within a preset symbol before the enablement time of the target bandwidth or within a preset symbol after the enablement time of the target bandwidth.

In one embodiment, the transceiver 61 is further configured to receive first capability indication information sent by the network node, and the first capability indication information is used to indicate that the network node has a variable bandwidth-based communication capability.

In one embodiment, the transceiver 61 is further configured to send second capability indication information to the network node, and the second capability indication information is used to indicate that the UE has a variable bandwidth-based communication capability.

In one embodiment, the bandwidth is a system bandwidth or a scheduling bandwidth.

The UE in this embodiment may be configured to perform the technical solutions performed by the UE in the method embodiments shown in FIG. 1 to FIG. 3. Implementation principles and technical effects thereof are similar. Details are not described herein again.

Figure 13:
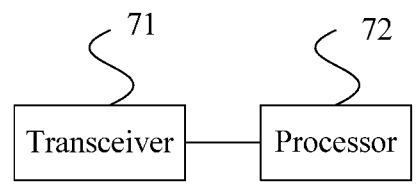
FIG. 13 is a schematic structural diagram of a network node according to a fifth embodiment of the present invention.

FIG. 13 is a schematic structural diagram of a network node according to a fifth embodiment of the present invention. As shown in FIG. 13, the network node in this embodiment includes a transceiver 71 and a processor 72. The network node in this embodiment may further include a memory (which is not shown), and the memory is configured to store program code for performing a variable bandwidth-based communication method.

The transceiver 71 is configured to send a configuration update message to a second network node. The configuration update message includes indication information and an identifier of a cell, and the indication information is used to indicate a target system bandwidth parameter of the cell.

The processor 72 is configured to communicate with UE based on the target system bandwidth parameter, and the cell is a serving cell corresponding to the UE.

The target system bandwidth parameter includes at least one of a target system bandwidth, a target center frequency, and an enablement time of the target system bandwidth.

The network node in this embodiment may be configured to perform the technical solutions performed by the first network node in the method embodiment shown in FIG. 6. Implementation principles and technical effects thereof are similar. Details are not described herein again.

Figure 14:
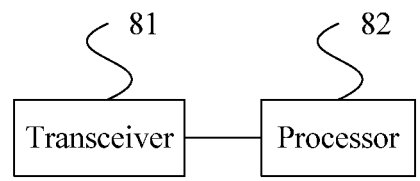
FIG. 14 is a schematic structural diagram of a network node according to a sixth embodiment of the present invention.

FIG. 14 is a schematic structural diagram of a network node according to a sixth embodiment of the present invention. As shown in FIG. 14, the network node in this embodiment includes a transceiver 81 and a processor 82. The network node in this embodiment may further include a memory (which is not shown), and the memory is configured to store program code for performing a variable bandwidth-based communication method.

The transceiver 81 is configured to receive a configuration update message sent by a first network node. The configuration update message includes indication information and an identifier of a cell, and the indication information is used to indicate a target system bandwidth parameter of the cell.

The processor 82 is configured to configure a measurement parameter of UE based on the target system bandwidth parameter, and a serving cell corresponding to the UE is a cell managed by the second network node.

The target system bandwidth parameter includes at least one of a target system bandwidth, a target center frequency, and an enablement time of the target system bandwidth.

The network node in this embodiment may be configured to perform the technical solutions performed by the second network node in the method embodiment shown in FIG. 6. Implementation principles and technical effects thereof are similar. Details are not described herein again.

Persons of ordinary skill in the art may understand that all or some of the operations of the method embodiments may be implemented by program instruction-related hardware. The foregoing program may be stored in a computer readable storage medium, and when the program is run, the operations of the method embodiments are performed. The foregoing storage medium includes any medium that can store program code, for example, a read-only memory (ROM), a random access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A variable bandwidth-based communication method, comprising:
sending, by a network node, indication information and a bandwidth parameter list to a user equipment (UE) by using a dedicated signaling, the indication information and the bandwidth parameter list are used to indicate a target scheduling bandwidth to the UE; wherein
the bandwidth parameter list comprises at least one group of bandwidths and parameter indexes corresponding to the at least one group of bandwidths, the at least one group of bandwidths comprises the target scheduling bandwidth, the indication information indicates a first parameter index corresponding to a target scheduling bandwidth parameter, the first parameter index is one parameter index of the parameter indexes;

communicating, by the network node, with the UE based on the target scheduling bandwidth.

2. The method according to claim 1, further comprising:
sending, by the network node, first capability indication information to the UE, wherein the first capability indication information indicates that the network node has a variable bandwidth-based communication capability.

3. The method according to claim 1, further comprising:
receiving, by the network node, second capability indication information from the UE, wherein the second capability indication information indicates that the UE has a variable bandwidth-based communication capability.

4. A variable bandwidth-based communication method applied in a terminal, comprising:
receiving indication information and a bandwidth parameter list from a network node, wherein the indication information and the bandwidth parameter list are used to indicate a target scheduling bandwidth used by a serving cell corresponding to the terminal; wherein the bandwidth parameter list comprises at least one group of bandwidths and parameter indexes corresponding to the at least one group of bandwidths, the at least one group of bandwidths comprises the target scheduling bandwidth, the indication information indicates a first parameter index corresponding to a target scheduling bandwidth parameter, the first parameter index is one parameter index of the parameter indexes;

obtaining the target scheduling bandwidth based on the indication information and the bandwidth parameter list; and communicating with the network node based on the target bandwidth parameter.

5. The method according to claim 4, further comprising:
receiving first capability indication information sent by the network node, wherein the first capability indication information is used to indicate that the network node has a variable bandwidth-based communication capability.

6. The method according to claim 4, further comprising:
sending second capability indication information to the network node, wherein the second capability indication information is used to indicate that the terminal has a variable bandwidth-based communication capability.

7. An apparatus, comprising:
a processor; and
a non-transitory memory, wherein the memory stores execution instructions; and when the processor executes the execution instructions, the apparatus is enabled to perform the following operations:

receiving indication information and a bandwidth parameter list from a network node, wherein the indication information and the bandwidth parameter list are used to indicate a target scheduling bandwidth used by a serving cell corresponding to the apparatus; wherein the bandwidth parameter list comprises at least one group of bandwidths and parameter indexes corresponding to the at least one group of bandwidths, the at least one group of bandwidths comprises the target scheduling bandwidth, the indication information indicates a first parameter index corresponding to a target scheduling bandwidth parameter, the first parameter index is one parameter index of the parameter indexes;

obtaining the target scheduling bandwidth based on the indication information and the bandwidth parameter list; and communicating with the network node based on the target bandwidth parameter.

8. The apparatus according to claim 7, wherein the apparatus is further enabled to perform the following operations:

receiving first capability indication information sent by the network node, wherein the first capability indication information indicates that the network node has a variable bandwidth-based communication capability.

9. The apparatus according to claim 7, wherein the apparatus is further enabled to perform the following operations:

sending second capability indication information to the network node, wherein the second capability indication information indicates that the apparatus has a variable bandwidth-based communication capability.

* * * * *